| 106-85. | AU 116 | EX |
| 4-16-74 | OR | 3,804,651 |

United States Patent [19]
Semler

[11] 3,804,651
[45] Apr. 16, 1974

[54] LIME SILICO-PHOSPHATE CEMENT

[75] Inventor: Charles E. Semler, Bethel Park, Pa.

[73] Assignee: The United States Department of Transportation, Washington, D.C.

[22] Filed: July 21, 1972

[21] Appl. No.: 273,746

[52] U.S. Cl. .................................. 106/85, 106/120
[51] Int. Cl. ........................... C04b 7/36, C04b 1/00
[58] Field of Search............................ 106/85, 120

[56] References Cited
UNITED STATES PATENTS

| 3,148,996 | 9/1964 | Vukasovich et al. ................ 106/87 |
| 3,167,439 | 1/1965 | Vukasovich et al. ................ 106/85 |
| 3,179,527 | 4/1965 | Vukasovich et al. ................ 106/85 |

*Primary Examiner*—Delbert E. Gantz
*Assistant Examiner*—S. Berger
*Attorney, Agent, or Firm*—Nathan Edelberg; Harold P. Deeley; Herbert E. Farmer

[57] ABSTRACT

A quick setting lime silico-phosphate cement prepared by reacting Wollastonite ($CaSiO_3$) and buffered phosphoric acid. The cement has particular utility in highway patching operations.

19 Claims, No Drawings

3,804,651

LIME SILICO-PHOSPHATE CEMENT

ORIGIN OF THE INVENTION

The invention described herein was made in the course of, or under, a contract with the Department of Transportation and may be manufactured and used by or for the Government for governmental purposes without the payment of any royalties thereon or therefor.

BACKGROUND OF INVENTION

1. Field of Invention

This invention relates to a method of preparing cements, specifically a quick setting lime silico-phosphate cement.

2. Description of the Prior Art

Portland cements are widely used for highway pavements because of the high strength of the cured concrete. These cements require long periods of time to reach full load bearing capacity and their early set strength is low. This property is not a significant factor when Portland cements are used for highway construction; but it is an important consideration in highway patching operations. The use of conventional Portland cements requires road closings of at least 4 to 24 hours as a result of this slow strength development.

Research in the field of quick setting cements has been restricted primarily to Portland cement technology because of the need to substantially duplicate the properties of the concrete forming the original road surface. This has resulted in the use of additives which impart higher early strength to conventional Portland cement compositions. These formulations have reduced the time for highway closings to about 1 to 2 hours. An example of this type of quick setting cement is disclosed is U.S. Pat. No. 3,628,973 where from 1 to 30 percent of a ternary calcium halo-aluminate is added to a conventional Portland cement. This composition develops a compressive strength of from 500 to 2,500 pounds per square inch in 1 hour.

SUMMARY OF THE INVENTION

The primary object of this invention is therefore to provide a cement composition which has a sufficiently high and rapidly developed early set strength to support normal highway loads within 1 hour after application.

Another object of this invention is to provide a cement composition which has these early strength characteristics and fully developed compressive strengths which are equivalent to conventional Portland cement.

A further object of this invention is the provision of a cement composition having these early strength characteristics which is compatible with conventional Portland cements.

These and other objects are achieved by reacting Wollastonite powder with a buffered phosphoric acid to form a lime silico-phosphate cement having a high early set strength.

Mixing these components in the proper proportions yields a cement which is characterized by a quick setting time (less than 15 minutes), a high compressive strength (5,000 to 10,000 p.s.i.) which is developed within less than 2 hours, low solubility and a cost which is essentially equivalent to quick setting Portland cements. These properties are controllable by adjusting the Wollastonite particle size, Wollastonite/sand ratio, acid/Wollastonite-sand ratio and the acid composition. Other properties such as tensile strength and flexural modulus and strength equaled or exceeded those of conventional cements. Additionally the cements show little or no degradation as a result of thermal cycling.

DESCRIPTION OF THE PREFERRED EMBODIMENTS

Wollastonite is a naturally occurring calcium metasilicate having an acicular particle morphology. A representative commercial Wollastonite had the following composition:

| | |
|---|---|
| $SiO_2$ | 50.9% |
| $CaO$ | 46.9% |
| $FeO$ | 0.55% |
| $Al_2O_3$ | 0.25% |
| $MnO$ | 0.10% |
| $MgO$ | 0.10% |
| $TiO_2$ | 0.05% |

The most significant characteristic of the Wollastonite for purposes of this invention is its acid solubility which can be functionally varied by varying the particle size. The particle size is one variable which controls the setting time and compressive strengths of the final product. For example, if Wollastonite having an excessive particle size is added to buffered phosphoric acid a dry mixture results which requires several hours to set and has unsatisfactory compressive strengths. The best cements have been obtained using Wollastonite classified as "medium ceramic" and "medium fine point" which have particle size distributions in which 96.5 percent and 99.8 percent, respectively, of the material passes through a 325 mesh screen. In some cases "coarse ceramic" Wollastonite also produces acceptable cements when mixed with the phosphoric acid. The particle size distribution of this grade is such that 97.7 percent passes through a 200 mesh screen. Cement prepared using "general all purpose" Wollastonite, in which 78 percent of the particles pass through a 20 mesh screen, was unsatisfactory in set time and in compressive strengths.

Wollastonite powders often contain small amounts of carbonate impurity which results in evolution of carbon dioxide when the powder is mixed with acid media. This produces a relatively low density and strength and high porosity cement. The carbonates may be decomposed by firing the Wollastonite powders prior to mixing with phosphoric acid. Sufficient carbonate decomposition results from heating in an air atmosphere overnight at a temperature of 1,000°C. This preliminary decomposition step substantially eliminates the problem of gas evolution.

To produce mortar for road patching purposes Wollastonite is mixed with sand in the ratio of 1:1 to 1:3. The optimum Wollastonie/sand ratio is governed by the grade of Wollastonite used in the mix. Use of "medium fine point" Wollastonite permits the use of a greater amount of sand. For example, a Wollastonite/sand ratio of from about 1:2.6 to 1:2.79. Satisfactory results are obtained using a lesser amount of sand with "medium ceramic" grade. For example, a Wollastonite/sand ratio of 1:1.22 to 1:1.86. It is also possible to blend different grades of Wollastonite together to obtain a usable cement. The incorporation of as much as 50 percent by weight "general all purpose" grade in a Wollastonite blend results in a usable cement.

A minor amount of blast furnace fines can be added to the Wollastonite-sand mixture to decrease the set time of the cement. However a corresponding reduction of compressive strengths also result. The use of up to 20 percent blast furnace fines based on the amount of Wollastonite has resulted in a satisfactory balancing of these two properties.

The acid media can be either wet process phosphoric acid or phosphoric acid reagent (85% $H_3PO_4$) of the type manufactured by Allied Chemical with controlled water dilution. The acid must be doped with zinc, aluminum and magnesium to obtain the quick setting characteristics of this invention. These metals are added to the acid in either elemental, oxide or salt form, the preferred technique being the addition of elemental metal powders or phosphate salts. The final acid when doped with metals, oxides or salts, other than phosphates, should have the following approximate composition:

| | |
|---|---|
| $P_2O_5$ | 37–60% |
| Zn | 6.0–8.5% |
| Al | 2.0–2.5% |
| Mg | 0.05 – 0.18% |

Acids buffered with phosphates should contain an approximate composition as follows:

| | |
|---|---|
| $P_2O_5$ | 37 – 46% |
| $Zn_3(PO_4)_2$ | 10 – 14% |
| $AlPO_4$ | 8 – 12.5% |
| $Mg_3(PO_4)_2 \cdot 5H_2O$ | 0.3 – 0.5% |

The lower maximum $P_2O_5$ content of the latter composition takes into account the contribution of the salts to the final phosphorous pentoxide concentration.

Buffered acid is mixed with the Wollastonite in the ratio of from 0.16 to 0.26 cc/gm. There is overlap in the liquid/powder ratio, as the amount of acid used is a function of Wollastonite particle size. Thus with "medium fine point" 0.195 – 0.24 cc/gm. of acid are preferred. When medium and coarse ceramic grades are used 0.24 to 0.26 cc/gm. and 0.18 to 0.22 cc/gm., respectively, have produced satisfactory cements.

Cements having compressive strengths of greater than 7,500 pounds per square inch (after a 4 hour dry cure) have been prepared from a "medium fine point" Wollastonite and phosphoric acid containing 49% $P_2O_5$, 6.3% Zn, 2.3% Al and 0.09% Mg.

The following examples illustrate the preparation of cements comprising this invention and illustrate the effect of varying the Wollastonite particle size, the Wollastonite/sand ratio, the acid/Wollastonite-sand ratio, the acid concentration, the type of dopant, and the type of acid used. Examples I to VI were performed using the preferred acid comprising 49% $P_2O_5$, 6.3% Zn, 2.3% Al, 0.09% Mg and "medium fine point" Wollastonite. The acid in each case was doped with 30 mesh granular, reagent grade zinc metal; aluminum pellets, code 1222, manufactured by Baker & Adamson; and 20-mesh, Code CB 479 magnesium metal manufactured by Coleman & Bell. The materials were added to 50% $P_2O_5$ phosphoric acid heated to a temperature of 60° to 100°C. In Examples VII and VIII wet process and phosphate doped acids, respectively, are substituted for the preferred composition. Note that the composition of the wet process acid is the same as that used in Examples I to VI. Examples IX and X illustrate the formation of cements with Wollastonite having larger particle sizes. Throughout the examples setting time was determined using a one pound Gillmore needle. Compressive strengths were measured after a four hour dry cure.

EXAMPLE I

Two samples were prepared by mixing Wollastonite and sand in a weight ratio of 1:2.76 and then adding 0.21 cc. of acid for each gram of the mixture. The samples set in 45 minutes and had compressive strengths of 5,288 and 5,462 p.s.i.

EXAMPLE II

Two additional samples were prepared by mixing Wollastonite and sand in a weight ratio of 1:2.73 and then adding 0.22 cc. of acid per gram of mixture. The samples set in 51 minutes and had an average compressive strength of 5,094 p.s.i.

EXAMPLE III

Using the same Wollastonite/sand ratio as Example II, 0.20 cc/gm. of acid were added. Two samples were prepared and had an average compressive strength of 5,844 p.s.i. while setting in 53 minutes.

EXAMPLES IV and V

Four samples were prepared using a Wollastonite/sand mixture in the ratio of 1:2.79. In two of the samples 0.22 cc. per gram of acid were added and 0.20 cc/gm. of acid were added to the remaining two. The latter samples set in 54 minutes and had an average compressive strength of 5,694. The former set in 60 minutes with average compressive strengths of 5,712.

EXAMPLE VI

Using a Wollastonite to sand ratio of 1:2.77 and 0.195 cc. per gram of acid two samples set in 29 minutes and had compressive strengths of 7,312 and greater than 7,500 p.s.i.

EXAMPLE VII

The supernatent liquid from 54% $P_2O_5$ wet process acid was diluted with water to obtain a 49 percent acid. Metallic dopants were added to produce an acid having 6.3 percent zinc, 2.3 percent aluminum and 0.09 percent magnesium. The acid was combined with Wollastonite-sand mixtures having ratios of 1:2.70 and 1:2.80. The addition of 0.22 cc. per gram of acid produced a cement which set in 40 minutes with a compressive strength of 4,519 with the former ratio. The addition of the same amount of acid to a mixture having the latter ratio resulted in a cement with a 4,012 p.s.i. compressive strength which set in 31 minutes. The addition of 0.2 cc. per gram of acid to these mixtures resulted in setting times of 35 and 29 minutes, respectively, with compressive strengths of 4,593 and 4,688, respectively.

EXAMPLE VIII

Two 2 inch cubes were prepared from a mortar formed by adding 0.16 cc. per gram of phosphoric acid comprising 46% $P_2O_5$, 2.5% $AlPO_4$, 14% $Zn_3(PO_4)_2$ and 0.5% $Mg_3(PO_4)_2$ to a mixture of Wollastonite and sand in a ratio of 1:2.76. The cubes set in 8 minutes and had compressive strengths of 5,950 and 5,912.

EXAMPLE IX

A medium ceramic Wollastonite was mixed with sand in the ratio of 1:2.65 of Wollastonite to sand and then combined with 0.24 cc/gm. of phosphoric acid. The acid contained 43% $P_2O_5$, 2.4% aluminum, 6.0% zinc and 0.09% magnesium. The samples set in 3 minutes and had an average compressive strength of 7,081.

EXAMPLE X

A coarse ceramic grade Wollastonite was mixed with sand in a ratio of 1:2.75. This mixture was combined with 0.18 gram per cc. of phosphoric acid having the same composition as the previous example. This cement had a compressive strength of 6,444 and set in 18 minutes.

The above disclosure is directed to a cement having utility for highway patching. However it should be recognized that the cement may be used for many other applications where conventional cements are used.

What is claimed is:

1. A method of preparing a quick setting cement comprising reacting Wollastonite with phosphoric acid buffered with aluminum, zinc and magnesium, and permitting the reaction mixture to set wherein said phosphoric acid comprises approximately 37 to 60% $P_2O_5$, 6.0 to 8.5% zinc, 2.0 to 2.5% aluminum and 0.05 to 0.18% magnesium, and wherein at least 97.7 percent of said Wollastonite passes through a 200 mesh screen.

2. The method of claim 1 wherein said phosphoric acid comprises approximately 49% $P_2O_5$, 6.3% Zn, 2.3% Al and 0.09% Mg.

3. The method of claim 1 wherein said phosphoric acid comprises approximately 37 to 46% $P_2O_5$, 10 to 14% $Zn_3(PO_4)_2$, 8 to 12% $AlPO_4$ and 0.3 to 0.5% $Mg_3(PO_4)_2$.

4. The method of claim 1 wherein at least 96.5 percent of the Wollastonite passed through a 325 mesh screen.

5. A method of preparing a quick setting cement comprising mixing Wollastonite and sand, reacting the mixture with phosphoric acid buffered with aluminum, zinc and magnesium, and then permitting said reaction mixture to set wherein said phosphoric acid comprises 37 to 60% $P_2O_5$, 6.0 to 8.5% Zn, 2.0 to 2.5% Al and 0.05 to 0.18% Mg, and wherein at least 97.7 percent of said Wollastonite passes through a 200 mesh screen.

6. A method of claim 5 wherein said phosphoric acid comprises 49% $P_2O_5$.

7. The method of claim 6 wherein said phosphoric acid further comprises 6.3% Zn, 2.3% Al and 0.09% Mg.

8. The method of claim 5 wherein at least 96.5 percent of said Wollastonite passes through a 325 mesh screen.

9. The method of claim 8 wherein at least 99.8 percent of said Wollastonite passes through a 325 mesh screen.

10. The method of claim 5 wherein said Wollastonite and sand are mixed in a ratio of 1:1 to 1:3.

11. The method of claim 8 wherein the Wollastonite and sand are mixed in a ratio of 1:1.22 to 1:1.86.

12. The method of claim 9 wherein said Wollastonite and sand are mixed in a ratio of 1:2.6 to 1:2.79.

13. The method of claim 5 wherein 0.18 to 0.26 cc/gm. of phosphoric acid are reacted with the Wollastonite/sand mixture.

14. The method of claim 8 wherein 0.24 to 0.26 cc/gm. of acid are reacted with the Wollastonite/sand mixture.

15. The method of claim 9 wherein 0.195 to 0.24 cc/gm. of acid are reacted with the Wollastonite/sand mixture.

16. The method of claim 7 wherein at least 99.8 percent of said Wollastonite passes through a 325 mesh screen.

17. The method of claim 16 wherein said Wollastonite and sand are mixed in a ratio of about 1:2.70 to 1:2.80 and 0.195–0.22 cc/gm. of said acid is added to the mixture.

18. The method of claim 5 wherein said phosphoric acid comprises 37 to 46% $P_2O_5$, 10 to 14% $Zn_3(PO_4)_2$, 8 to 12% $AlPO_4$ and 0.3 to 0.5% $Mg_3(PO_4)_2$.

19. A quick setting cement prepared by the method of claim 5.

* * * * *